(12) United States Patent
Lamy-Bergot et al.

(10) Patent No.: US 8,321,754 B2
(45) Date of Patent: Nov. 27, 2012

(54) METHOD FOR TRANSMITTING MULTIMEDIA DATA IN AD HOC COMMUNICATION NETWORKS

(75) Inventors: Catherine Lamy-Bergot, Paris (FR); Fracchia Roberta, Paris (FR)

(73) Assignee: Thales, Neuilly sur Seine (FR)

( * ) Notice: Subject to any disclaimer, the term of this patent is extended or adjusted under 35 U.S.C. 154(b) by 225 days.

(21) Appl. No.: 12/847,865

(22) Filed: Jul. 30, 2010

(65) Prior Publication Data

US 2011/0131466 A1 Jun. 2, 2011

(51) Int. Cl.
G06F 11/00 (2006.01)
(52) U.S. Cl. ......................... 714/758; 370/469
(58) Field of Classification Search ................. 714/758, 714/748, 750, 712; 370/473, 469
See application file for complete search history.

(56) References Cited

U.S. PATENT DOCUMENTS

| | | | | |
|---|---|---|---|---|
| 2003/0112822 A1* | 6/2003 | Hong et al. | ................. | 370/469 |
| 2007/0008884 A1* | 1/2007 | Tang | ................. | 370/230 |
| 2008/0002611 A1* | 1/2008 | Walker et al. | ................. | 370/328 |
| 2008/0250294 A1* | 10/2008 | Ngo et al. | ................. | 714/752 |
| 2009/0271684 A1* | 10/2009 | Yousef | ................. | 714/776 |

FOREIGN PATENT DOCUMENTS

WO WO 2006/122225 11/2006

OTHER PUBLICATIONS

Ian Chakeres et al. "Allowing bit errors in speech over wireless LANs" Computer Communications, Elsevier Science Publishers BV, Amsterdam, NL LNKD-DOI:10.1016/J.COMCOM.2005.02.009, vol. 28, No. 14, Sep. 1, 2005, pp. 1643-1657.
Patrick Pak-kit Lam et al. "UDP-liter: an 1-8 improved UDP protocol for real-time multimedia applications over wireless links" Wireless Communication Systems, 2004, 1st International Symposium on Mauritius, Sep. 20-22, 2004, Piscataway, NJ, USA, IEEE LNKD-DOI:10.1109/ISWCS/2004.1407260, Sep. 20, 2004, pp. 314-318.
Search Report, completed on Apr. 7, 2010, for FR 0903789, filed on Jul. 31, 2009.

* cited by examiner

*Primary Examiner* — Dieu-Minh Le
(74) *Attorney, Agent, or Firm* — Stroock & Stroock & Lavan LLP

(57) ABSTRACT

A method for transmitting multimedia data in an ad hoc network including receiving a packet on a radio interface, and if the node is not its destination, is copied into a local buffer Q while awaiting the verification of the packet, the packet is also uploaded to the top layers for on the one hand verification of its possible corruption and on the other hand optional storage in a local stack P of long duration with additional information about the data fragment. In the case where the transmission on the last hop before the current node has corrupted the packet, it is verified that the headers are intact so as to be able to route the packet appropriately, after having verified whether the stack P is present and whether it contains an intact version of the packet, in which case it is the intact payload which will be substituted for the erroneous payload in the buffer Q. If the stack P is not present or does not contain the packet, then the method will nevertheless propagate the packet when only the payload has been corrupted since a robust multimedia decoder might be able to use this packet correctly.

8 Claims, 8 Drawing Sheets

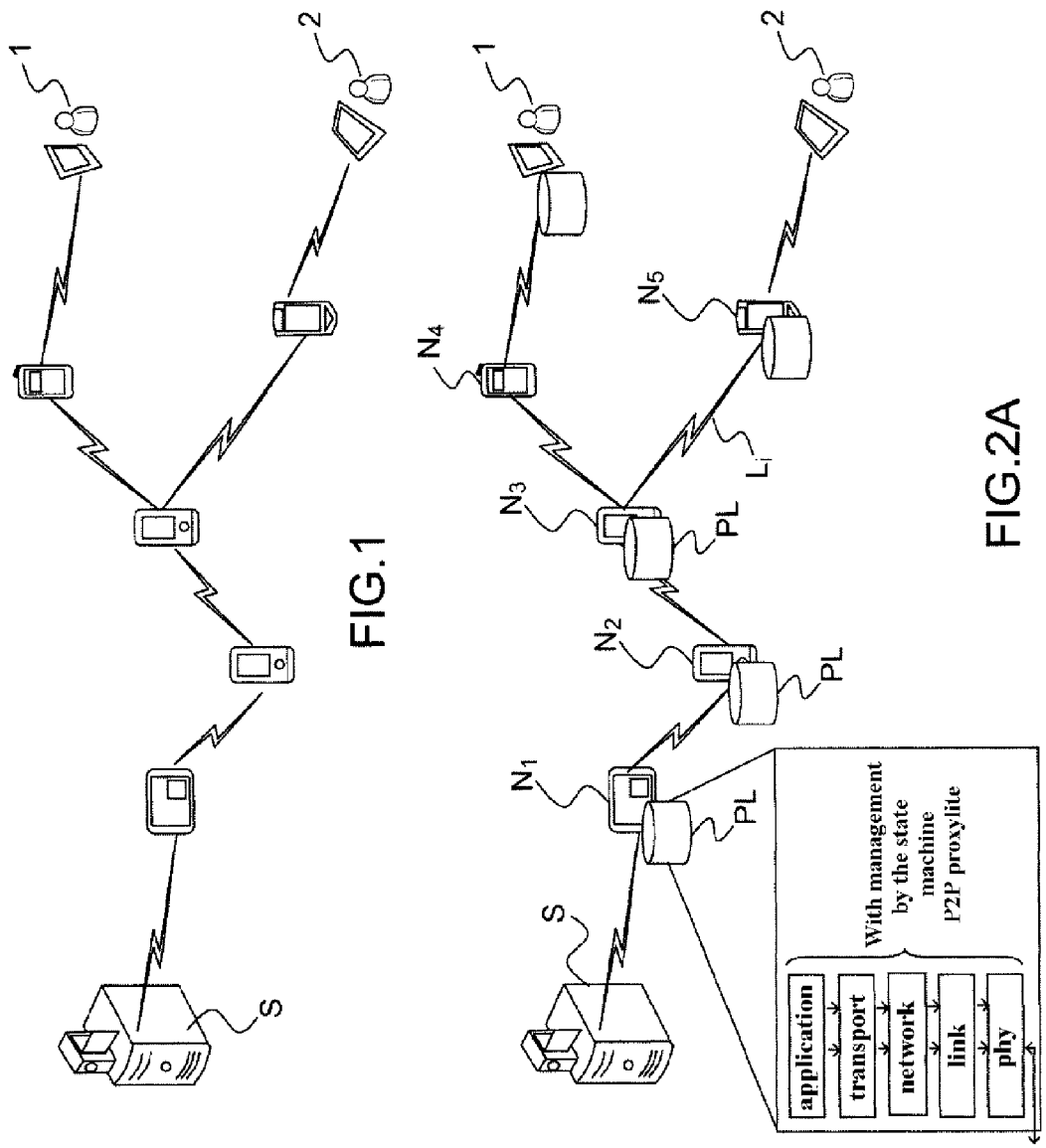

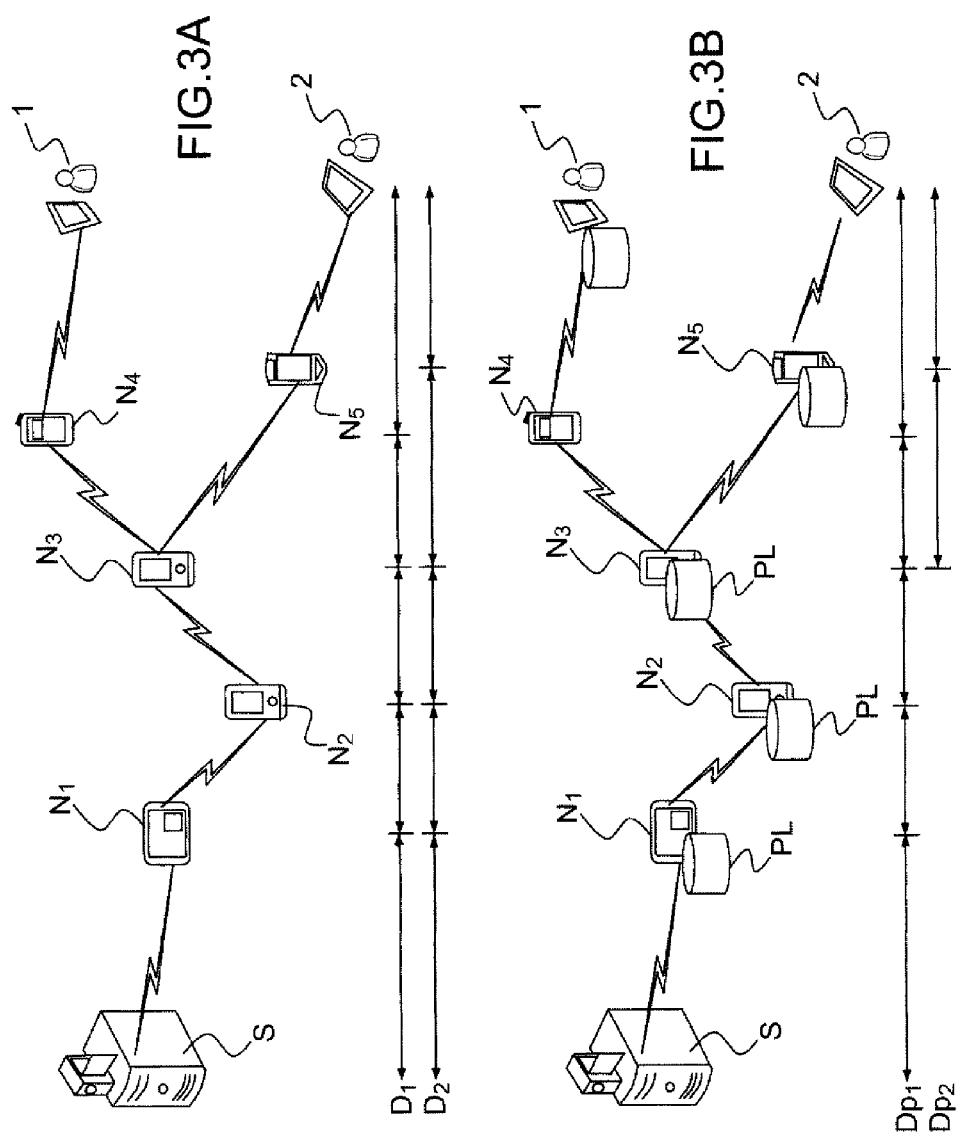

METHOD FOR TRANSMITTING MULTIMEDIA DATA IN AD HOC COMMUNICATION NETWORKS

CROSS REFERENCE TO PRIOR APPLICATIONS

This application claims priority to French Application No. 0903789, filed on Jul. 31, 2009, which is incorporated by reference herein in its entirety.

FIELD

Embodiments of the present invention relate to a method for transmitting data in a communication network which uses intelligent "proxy" in each point of a peer network. The word "proxy" designates the relaying of the requests between a client post and a server or a source and the expression "peer-to-peer network" designates a network in which there is sharing of the files peer-to-peer fashion.

The method according to an embodiment of the invention relates to multimedia stream broadcasts in an ad hoc communication network context from a source to multiple clients. For reasons of simplification in the rest of this description, the word "proxylite" will be used to designate in a generic manner the method according to an embodiment of the invention, whatever embodiment is envisaged

BACKGROUND

In the field of wireless communications, various protocols have been introduced in recent years to allow the propagation in the OSI layers (the acronym standing for "Open Systems Interconnection") of packets whose content is not perfect. Wimax the acronym standing for Worldwide Interoperability for Microwave Access is the most notable case for the radio layers, where a checksum reduced to the link header has been introduced, and makes it possible to upload a non-perfect packet to the network layer. Similarly, transport protocols such as UDP-Lite, which is very similar to the UDP protocol, have appeared. The UDP Lite protocol permits partial checks which cover a part only of the data and can deliver partially corrupted packets. It is particularly useful for multimedia transmissions, such as video stream broadcasting or Voice over IP, in which it is preferable to receive a packet with a partially damaged payload than not to receive packets at all. The DCCP protocol, the acronym standing for "Datagram Congestion Control Protocol", is a message-oriented transport layer communication protocol. These last two transport protocols, UDP-Lite and DCCP, have introduced partial checksums making it possible to verify the headers of the packets while letting through packets whose payload or useful data is erroneous.

The existing system exhibits notably the drawback of working exclusively with retransmission solutions in point-to-point mode or with multicast solutions, broadcast for sending information from a sender to a group (optionally with retransmissions) for temporally synchronized multipoint broadcasts.

In these techniques, the capability of multimedia streams to permit decodings even on partially corrupted streams is not harnessed. The techniques known therefore do not adapt to the limitations of ad hoc networks, for example, by knowing how to effectively harness the particular capabilities of multimedia streams.

SUMMARY

Embodiments of the present patent application relate to a more effective broadcasting method than the methods known for multimedia streams in a context of ad hoc communication from a source to multiple clients. The benefit of considering multimedia transmissions in particular, is explained by the fact that sound, image or video decoders are capable of absorbing a residual error rate, because these decoders generally employ masking techniques which exploit the human capabilities of the eye and ear to accept or compensate for residual defects.

Embodiments of the invention relate to a method for transmitting multimedia data in an ad hoc communication network including at least one source S and several nodes Ni communicating with one another by means of links Li, a number Np of the said nodes being equipped with a processor for implementing at least the following steps:

Receiving at least one multimedia data packet,
Performing a calculation of the complete radio CRC of the said packet received, a) in the case where the value of the header CRC includes an error, then the packet is eliminated,
b) in the case where the value of the header CRC is error-free, then the following step consists in looking to see whether the current node Ni is the addressee node
c) If the current node is the addressee node, then the method will upload the value of the complete radio CRC, test whether the value of the transport CRC is erroneous, eliminate the packet if this value is erroneous, otherwise, upload the packet to the application for decoding,
d) If the current node is not the addressee node, then, the method stores the packet in a temporary stack Q and initializes a timer T (pkltd) corresponding to a maximum duration of processing of the data of the packet,
the method thereafter verifies the value of the complete radio CRC of the packet,
if said value is correct then the method will modify the stack Q and reset the timer T(pkltd) to zero so as to dispatch the packet, and then the method starts the processing of another multimedia data packet,
if the value of the CRC of the data is erroneous, then the method launches the triggering of the timer CKS_VER(Pkld), for a verification at the data load integrity level,
in parallel, the method performs the uploading of the packet of the multimedia data to the top layers of the radio network, while eliminating the packets for which the value of the transport CRC is erroneous and while uploading the correct headers for the packet Pkld for the packets for which the value of the CRC is correct,
if the timer CKS_VER(Pkld) which corresponds to the verification of the integrity of the packet has expired, in all cases, the method modifies the stack Q by eliminating the packet,
e) upon the expiry of the timer T(Pkld) the method will extract the packet from the stack Q so as to transmit it on a new hop, or to another node of the network, for this purpose it will perform a re-calculation of the complete radio CRC, and then will send the packet on the physical link to the next hop destined for a node of the network.

In the course of step d), if the timer CKS_VER(Pkld) has not expired, then the method can modify the temporary memory or stack Q by setting a field indicating the corruption of the packet, for example by the indication (CRC_Error_Flag).

According to a variant embodiment a data packet includes a label corresponding to an item of information in a specific stretch of the RTP header of the packet, the said specific RTP header containing an additional checksum allowing the validation of the RTP header and optionally of the first bytes of the payload, packets being eliminated when this value is erroneous.

The method can include a step of storing information including at least the following steps:

when the node on which the data are received is the addressee, simultaneously the method uploads the value of the complete radio CRC, and makes a copy of the packet in a stack P for storage in the said stack P of the identifier of the packet, of the payload or its data of the packet and the state of the packet, in the case where the node is not the addressee, then, when the value of the complete radio CRC is incorrect, the method uploads, the erroneous information item for storage, and triggers the timer CKS_VER(PkId) for verification of the packet, when the value of the complete radio CRC is correct and the value of the CRC_Error Flag is correct, the said method transmits the correct information item for storage, uploads the erroneous information item for storage and according to the steps of the method described above, the method triggers a request for verification of the integrity of the packet CKS_VER_REQ, and timer launch CKS_VER(PkId) for verification of the integrity of the packet, during the step of uploading the packet to the top layers, the method will upload the storage information for the packet PkId to the stack P, in the case where the transmission on the last hop has corrupted the packet, the response module for answering the check requests CKS_VER_REQ is invoked and will therefore, upon the launch of the timer CKS-VER(PkId), in parallel with the uploading, interrogate the stack P to verify whether the latter contains an intact version of the packet, in which case the timer CKS_VER(PkId) is set to zero, and the method substitutes for the erroneous payload the intact payload in the buffer Q, upon the expiry of the timer T(PkId), the method will extract the packet for transmission while having beforehand, recalculated the radio CRC, if it does not find any intact packet, the method awaits the packet uploading and it propagates the packet when only the payload or data has been corrupted.

During the storage in the stack P, the method stores, for example, the data received at the level of the node as well as the data identification, an information item regarding its possible corruption upon each uploading in the stack P.

The method can include a step of intercepting the upgoing requests, the requests sent from a client to the sending source, and in that it includes at least the following steps:

On receipt of a new multimedia transmission request, the method:
  calculates the complete radio CRC value.
  tests the value of the link header CRC,
    if the latter is erroneous, then the packet is eliminated
    if the value of the header CRC is error-free: then
      if the node is the addressee: the packet is uploaded to the application
      if the node is not the addressee, then:
        the packet is stored in the temporary stack Q with the timer T(pkltd)
        the packet is uploaded to the application,
        upon the expiry of the timer the packet is transmitted on a new hop after re-calculation of the complete CRC
At the application level:
  if the requested data are stored in the stack P, the stack dispatches the necessary response or commences directly the transmissions of the requested data, otherwise it dispatches a message to eliminate the packet from the stack Q.

Embodiments of the invention also relate to a system for transmitting multimedia data in an ad hoc network including at least one source sending multimedia data and several nodes Ni communicating with one another by virtue of links Li, the said nodes including a receiver part, making it possible to receive a data packet, and a sending part the function of which is to transfer a packet to an Ni, wherein Np nodes are equipped with the following additional elements: a stack Q corresponding to a temporary storage memory, a stack P or long-term memory, and a processor adapted for executing the steps of the method according to the characteristics previously described.

BRIEF DESCRIPTION OF THE DRAWINGS

Other characteristics and advantages of the device according to the invention will be more apparent on reading the description which follows of an exemplary embodiment given by way of wholly nonlimiting illustration and accompanied by the figures which represent:

FIG. 1, an example of an ad hoc network and various mobile peer-to-peer communications, FIG. 2A, an exemplary architecture of the network according to an embodiment of the invention, FIG. 2B, an exemplary structure of data packets, FIG. 2C, an exemplary physical implementation at the level of a node of the network, FIGS. 3A, 3B, a comparison between the number of hops carried out in the case of the transmissions according to existing systems and in the case of transmissions according to an embodiment of the invention, FIG. 4, the reduction in the number of hops to be made FIG. 5A, a first variant embodiment of the method according to an embodiment of the invention and FIG. 5B, a variant where a node of the network includes a permanent storage stack, FIGS. 6, 7, 8 and 9 results evidencing the improvement of the transmission with respect to the techniques of the prior art by the implementation of the method and system according to an embodiment of the invention.

DETAILED DESCRIPTION

In order to better elucidate the subject of the present invention, the description which follows relates to the case where two distinct clients wish to obtain the same content from one and the same source.

FIG. 1 shows diagrammatically an ad hoc network according to the prior art for mobile peer-to-peer communication from a source S of video data with two clients 1, 2 identified from among the peers of the ad hoc network.

FIG. 2A shows diagrammatically an exemplary implementation of the method and system according to an embodiment of the invention including, in the same manner as in FIG. 1, a source S and two clients 1, 2. The clients 1, 2 in this example wish to obtain the same content from one and the same source. The requests being, in general asynchronous, they are processed separately as unicast communications (an acronym for defining a point-to-point network connection). Moreover, even in the case of synchronous requests, the establishment of multicast links on an ad hoc network remains a complex problem. In this figure are represented n nodes referenced Ni, a given number Np of which are equipped with an application PL according to an embodiment of the invention or software capable of managing multimedia data transmissions, for example, node $N_4$ in the figure not being provided with equipment according to an embodiment of the invention. Links Li allow the communication and transmission of information or data between them.

Figure 2B:
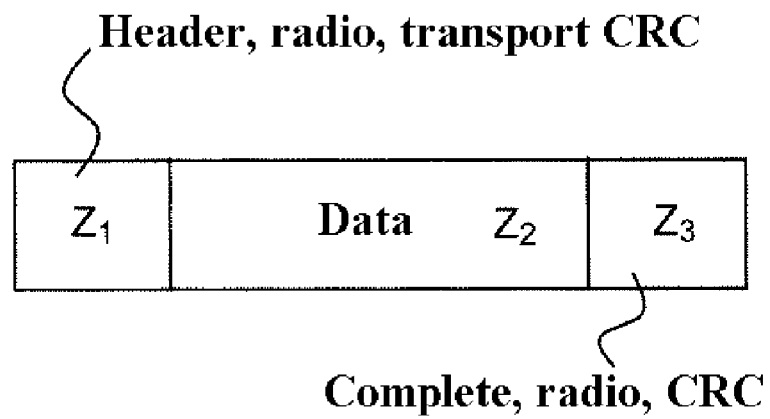

FIG. 2B shows diagrammatically an exemplary structure of multimedia data packets at the MAC (medium access control) level, including one or more headers, areas Zi, followed by an area $Z_2$ containing the payload or multimedia data, and also including one or more areas Zi for the various CRCs detailed in the subsequent description. In the CRCs to be verified, it is possible to mention the transport, header, radio CRCs which are in general disposed before the data area $Z_2$.

Figure 2C:
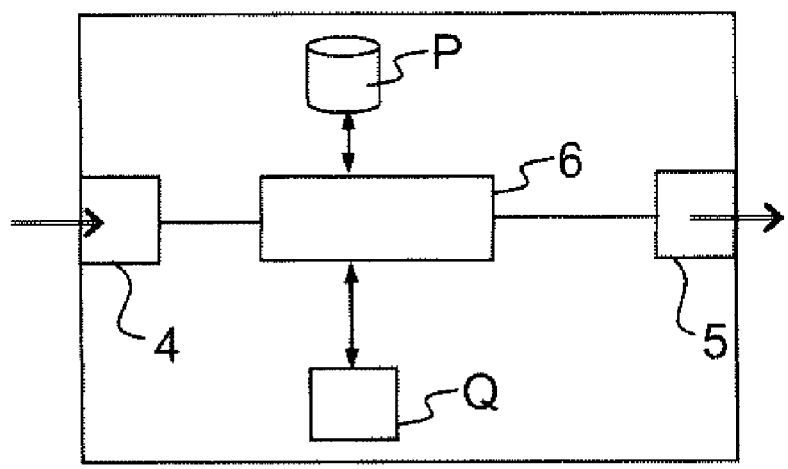

FIG. 2C represents an exemplary architecture of a node provided with equipment according to an embodiment of the invention including a conventional receiver part 4, making it possible to receive a data packet and to transmit it to a processor 6 on which a method according to an embodiment of the invention is implemented, a stack P or long-term memory and a stack Q corresponding to a temporary storage memory, an emitter 5 whose function is to retransmit the packet to another hop or other node Ni, and a request module 70 for answering requests to check the integrity of a packet, the said module being for example implemented at the level of the processor 6 and not represented in the figure. The node can also include a routing table not represented for simplification reasons giving the destination of a packet received or else software making it possible to perform routing requests to ascertain the addressee node of a packet.

In the case of multimedia stream transmission, the splitting into packets for transmission on a network of IP type (abbreviation of the Internet Protocol) means that each IP packet contains a fragment of the information of the multimedia stream. On reception, the concatenation of the data fragments will yield a stream which is equal or similar (if losses or errors have occurred) to the original stream.

In the conventional case, according to the methods known from the prior art, each client will receive their data directly from the source S, this being represented in FIG. 3A by the "diagram" of the hops performed from the source to the client 1 or to the client 2.

On the other hand, in the case where an intelligent proxy function according to an embodiment of the invention is introduced at least at the level of some of the nodes Ni of a network of ad hoc type, the second request, that of the client 2, for example, will not necessarily have to be uploaded as far as the source S but may be served by virtue of the data storage executed subsequent to the first communication. This difference is illustrated in FIG. 3B by the diagrams of hops Dp1 and Dp2, where it is seen that the hops for the client 2 start from the third node $N_3$ and pass through node $N_6$.

Figure 4:
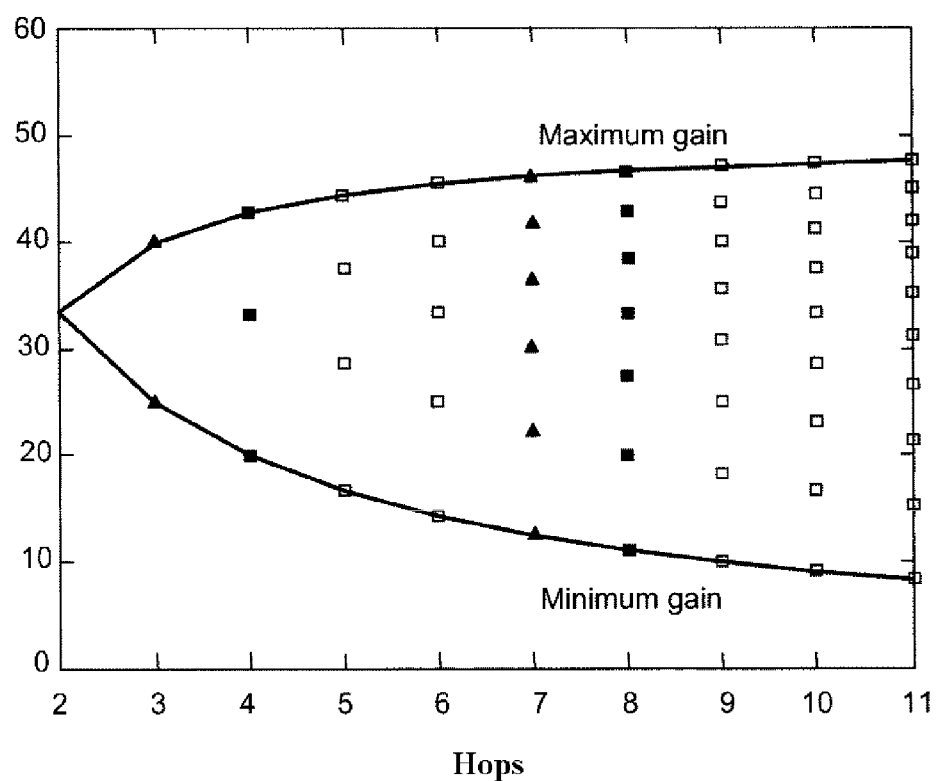

FIG. 4 represents the theoretical result of the saving in terms of the number of messages to be dispatched for two clients according to their respective distance and their distance from the source S. This number of measurements is proportional to the number of hops eliminated.

Figure 5A:
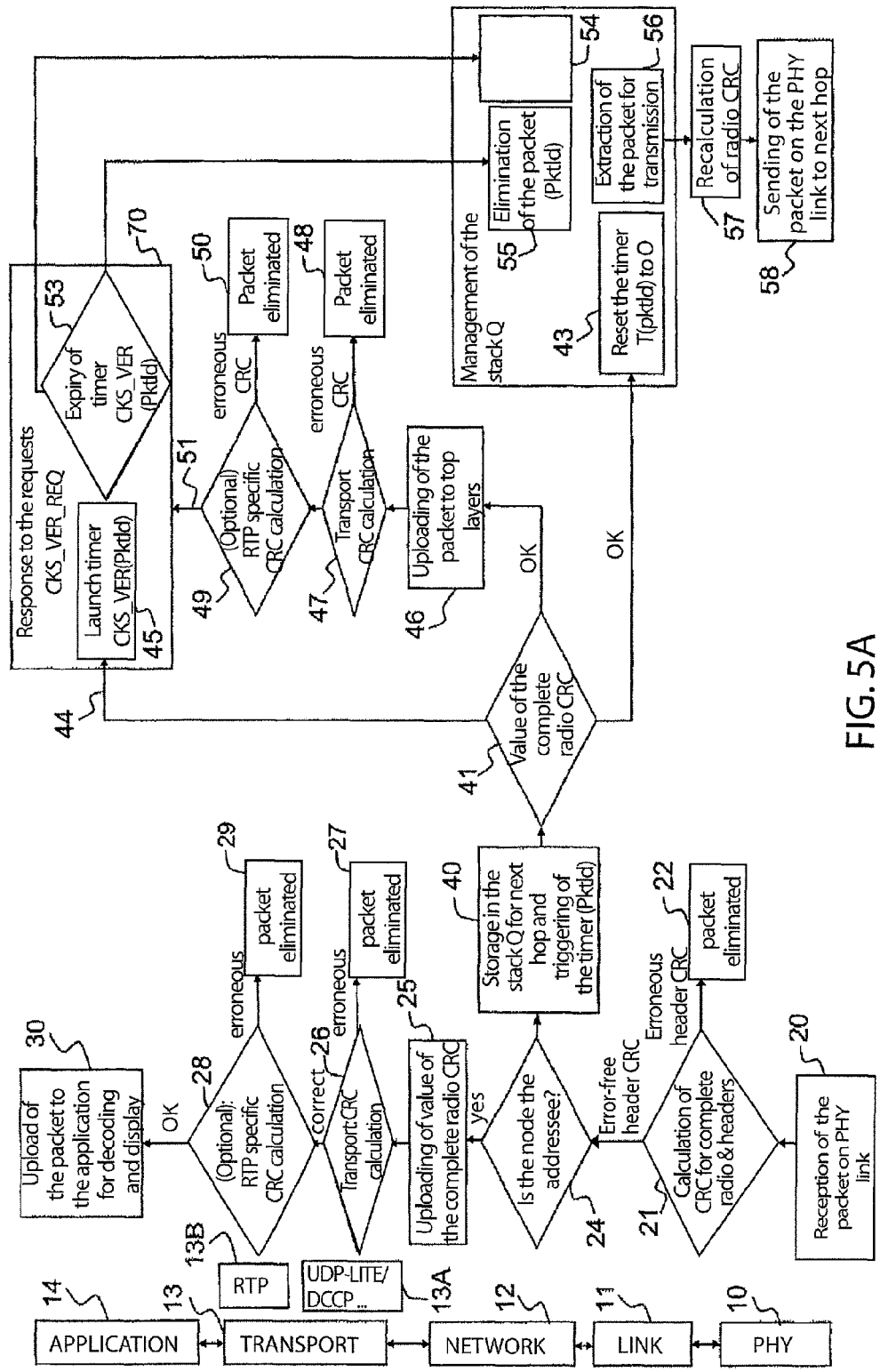
Figure 5B:
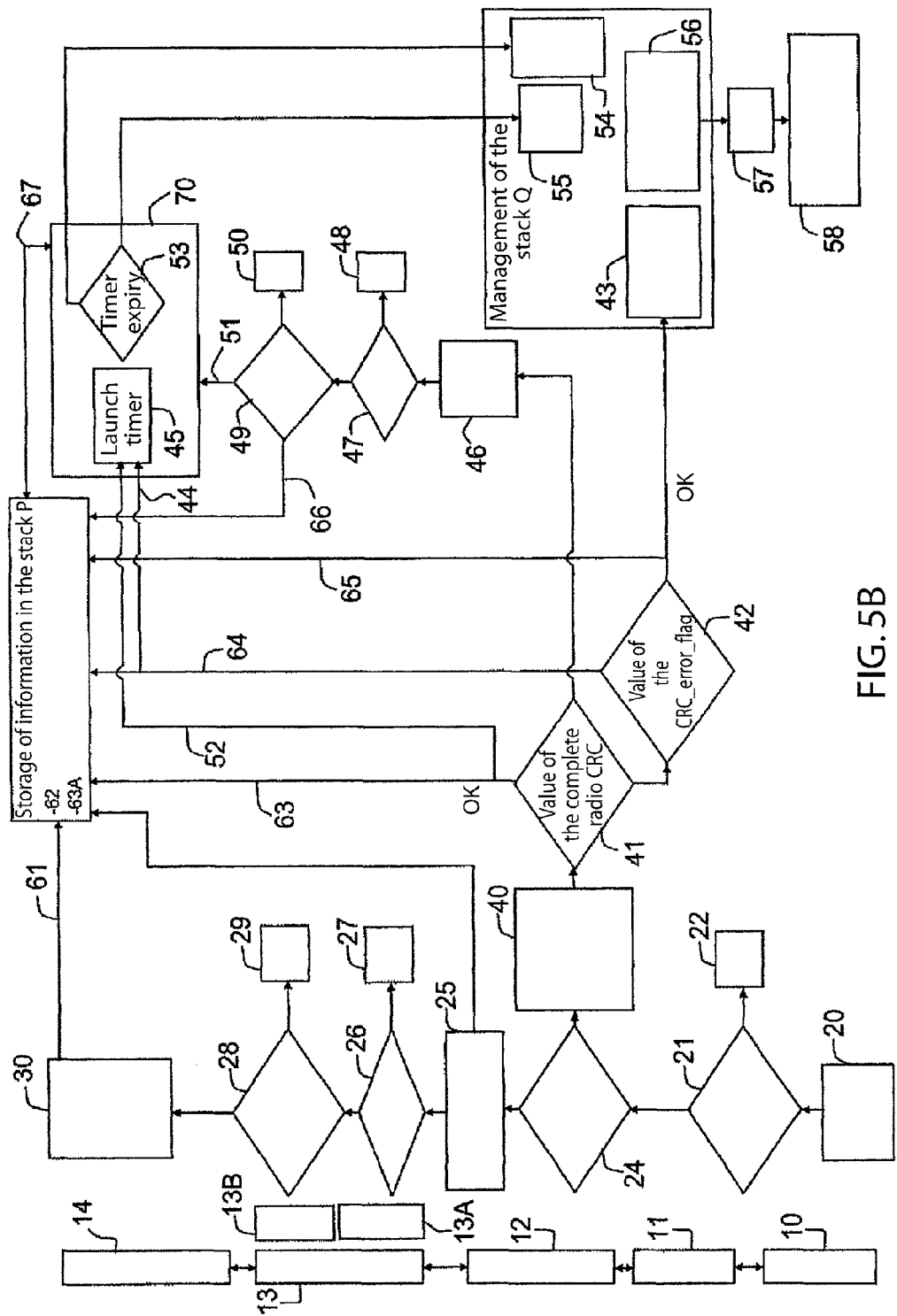

In a more detailed manner, the method implemented according to embodiments of the invention is detailed in FIG. 5A and in FIG. 5B according to two implementation variants. In these FIGS. 5A, 5B have been represented, for the record, the physical layer 10, the link layer 11, the network layer 12 on which lies the transport layer 13 that may be composed of a protocol layer of UDP-Lite type and of the RTP layer, and then of the application layer 14. This example corresponds to a structure given by way of wholly nonlimiting illustration to describe the method implemented by an embodiment of the invention.

The description will refer to these two FIGS. 5A and 5B to describe two implementational variants of the method according to embodiments of the invention. The first implementation relates more particularly to the processing of the packets received by a non-addressee node, the second variant adds a stack P or storage memory to the node.

One of the functions of the "proxylite" method according to an embodiment of the invention implemented on various nodes of the network is, notably, to replace the simple-relay function carried out by the node in the ad hoc network by executing downgoing operations, that is to say, on the packets transmitted from the source S to a client 1, 2.

The details of the processings performed by the "proxylite" method according to an embodiment of the invention are summarized as follows, and as illustrated by the description in FIGS. 5A, 5B of two variant embodiments, of the state machine dealing with the storage of the data in reception and retransmission to the next hop ("downgoing" operations).

The first implementation variant includes, for example, the following steps, the reference numbers making it possible to find the step in FIG. 5:

20—the reception of a data packet

21—the processor 6 performs a calculation of the complete radio checksum (conventionally denoted CRC), that is to say pertaining to the entirety of the data, including the various headers; it will be noted that within the framework of the method according to an embodiment of the invention, various checksums may be performed on the total packet, i.e. certain headers: link layer level header, header of the transport protocol, and optionally a specific checksum that may be introduced on the RTP (Real-time Transfer Protocol) header 22—in the case where the value of the link header CRC includes an error, then the packet is eliminated, 24—in the case where the value of the link header CRC is error-free, then the following step consists in looking to see whether the current node Ni is the addressee node. This is done, for example by verifying an identifier contained in the data packet transmitted.

If the current node is the addressee node, then the method will upload the value of the complete radio CRC 25, the processor will test, 26, whether the value of the transport CRC is erroneous, in the case where this value is erroneous, 27, the packet is eliminated, in the converse case, the processor can also test whether the value of the specific CRC for RTP is erroneous, in the case where an RTP specific CRC has been added if it is erroneous, 29, the packet is eliminated, otherwise, the packet is uploaded to the application 30 for decoding and display; the addition of the RTP CRC is an optional step in the method;

If the current node is not the addressee node, then, 40, the method will store the packet in the temporary stack Q and initialize a timer T(pkltd) corresponding to a maximum duration of processing of the data of the packet, the method thereafter verifies the value of the complete radio CRC of the packet, 41, (verification of the CRC of the integrity of the data and of the header), if the value is correct then the method will modify the stack by setting to zero the timer T (pkltd) 43, for immediate dispatch of the packet (56, 57, 58) after having recalculated the radio CRC, the packet is sent by the physical layer to the next hop, and then the method starts the processing of another multimedia data packet, if the value of the CRC data is erroneous, then 44, it launches the triggering of the timer CKS_VER(Pkld), 45, verification at the data load integrity level, and in parallel, the processor executes the uploading 46 of the packet to the top layers, and then calculates 47 the transport CRC, if the value of the transport CRC is erroneous, 48, then the method eliminates the packet, if the value of the transport CRC is exact, then the method can also test the value of the RTP specific CRC, 49, in the case where the latter exists, for example, if this value is erroneous, then the packet is eliminated 50, if this value is exact, then the method will upload 51 the correct headers for the packet Pkld, if the timer VER(Pkld) which corresponds to the verification of the integrity of the packet has expired, in all cases, the method modifies the stack Q by eliminating 55 the packet Pkld, if the timer VER(Pkld) has not expired, then the method can in an optional manner modify the temporary memory or stack Q by setting in the packet a specific information field (termed CRC error flag of the packet Pkld) indicating that it is not perfect 54, upon the expiry of the timer T(Pkld), 56, the method will extract the packet from the stack Q so as to transmit it to the sender of the node for transmission on a new hop, or to another node of the network, for this purpose it will perform a re-calculation of the complete radio CRC 57, and then will send the packet on the physical link 58 to the next hop destined for a node of the network.

According to a second implementation variant, it is considered that a node may be equipped with a stack P or long-term memory which will serve for storing information on packets that have passed through this node, whether the node is the addressee or simply a transit node capable of preserving the data for a use a future request after CRC recalculations, if any.

In this case, the method detailed in FIG. 5B possesses, as well as the steps described in conjunction with FIG. 5A, the additional steps described hereinafter, the similar references in FIGS. 5A and 5B correspond to identical states or steps of the method.

When the node is the addressee, when the method uploads the value of the complete radio CRC (step 25), it will additionally, 61, make a copy of the packet in the stack P for storage and 62, store in the stack P the identifier of the packet, the payload or the data of the packet and the state of the packet (integrity of the packet, errors contained in the data or the payload), for example the CRC error flag field.

In the case where the node is not the addressee, then, when the value of the complete radio CRC is incorrect, the method uploads 63, the erroneous information item 63A, for storage, and triggers 52 the timer CKS_VER(Pkld) for verification of the packet, step 63=erroneous, information item for storage PKT_RX_INF (Pkld)=1, step 52=erroneous, dispatching of CKS_VER_REQ.

When the value of the complete radio CRC 41 is correct and the value of the CRC_Error Flag is correct 42, it transmits, 65, the correct information item for storage, then the method uploads 64, the erroneous information item for storage in the stack P and as in the previous sub-method, the transmission of a request for verification of the integrity of the packet CKS_VER_REQ, and timer launch (44, 45) CKS_VER(Pkld) for verification of the integrity of the packet takes place, step 65=correct, information item for storage PKT_RX_INF (Pkld)=0.

During the step of uploading the packet to the top layers 46, described in FIG. 5A, the method will upload, 66, to the stack P the storage information for the packet Pkld (counterpart of the information item PKT_RX_INF(Pkld) which informed of the potential arrival of a packet with the value of the CRC_Error_Flag, taking account also of the RTP header CRC in the case where this checksum exists.

In the case where the transmission on the last hop has corrupted the packet, the response module 70 for answering the check requests CKS_VER_REQ is invoked and will therefore, upon the launch of the timer CKS-VER(Pkld), in parallel with the uploading 51, interrogate 67, the stack P to verify whether the latter contains an intact version of the packet, in which case the timer CKS_VER(Pkld) is set to zero, and it is the intact payload which will be substituted for the erroneous payload in the buffer Q 54, replacement with the correct packet Pkt. Thereafter, upon the expiry of the timer T(Pkld) 56, the method will extract the packet for transmission while having beforehand, recalculated, 57, the radio CRC as was explained previously. If it does not find any intact packet, the method awaits the uploading 51 and then propagates the packet when only the payload has been corrupted since a robust multimedia decoder might be able to use the packet correctly. In this case, the headers for packet (Pkld) are correct, step 51=Correct header for packet (Pkld), PKT_HD_INF (Pkld)=0.

One of the other benefits of introducing the stack P is the possibility by virtue thereof of the node carrying out a proxy function, by acting on the upgoing path, that is to say on requests transmitted from the client to the source, so as to interrogate the stack P on the packets requested from the server and to modify the requests so as to let through only requests that the current node cannot serve (with or without erroneous packets depending optionally on the client's choice) and the dispatching in parallel of the available packets to the client. This variant embodiment is implemented in the following manner:

On receipt of a new multimedia transmission request, the method:

calculates the complete radio CRC value.

tests the value of the link header CRC, if the latter is erroneous, then the packet is eliminated if the value of the header CRC is error-free: then if the node is the addressee: the packet is uploaded to the application if the node is not the addressee, then:

the packet is stored in the temporary stack Q with the timer T(pkltd)

the packet is uploaded to the application, upon the expiry of the timer the packet is transmitted on a new hop after re-calculation of the complete CRC At the application level:

if the requested data are stored in the stack P, the stack dispatches the necessary response or commences directly the transmission of the requested data, otherwise it dispatches a message to eliminate the packet from the stack Q (this packet must not be transmitted on a new hop).

To summarize, in the second variant embodiment of the invention including the presence of a stack P, the method in addition to the steps implemented in the course of the first variant executes the following steps:

Storing the data received at the level of the node in a stack P,

Adding a marking information item, that is to say the identification of the data fragment, the information about its possible corruption upon each uploading in the stack (which functionality was only optional in the first variant).

In practice, to carry out these functions, the operations will preferably be carried out in the so-called "proxylite" software according to an embodiment of the invention at the level of the top layers (application). The management of the packet is offloaded to the application level (user space) as are the verifications and decisions, and then the method returns to the stack of temporarily stored packets so as optionally to modify, eliminate or retransmit the packet. This uploading in the layers is explained by the fact that the marking relies on the calculation of checksums (at the radio level and at the transport level) which are naturally processed by the machine by uploading the packets from the radio layer.

The "proxylite" will thus be able to undertake the storage in a stack at the application level of the packets received and the implementation of a tool for marking the packets making it possible to apply a label to them indicating whether the packet is correct or corrupted.

The packet (identified by Pkld) is received on the radio interface, and if the node is not its destination, is copied into a local buffer (Q) while awaiting the verification of the packet: transmission to the following node will be done if and only if the headers (radio, network and transport) are correct.

The packet is also uploaded to the top layers for on the one hand verification of its possible corruption (the integrity of the various headers is verified by virtue of their respective checksums) and on the other hand storage in a local stack (P) of long duration with additional information about the data fragment (fragment identifier, possible corruption, etc.).

In the case where the transmission on the last hop before the current node has corrupted the packet, it is verified that the headers are intact so as to be able to route the packet appropriately, after having verified whether the stack P is present and whether it contains an intact version of the packet, in which case it is the intact payload which will be substituted for the erroneous payload in the buffer (Q). If the stack P is not present or does not contain the packet, then the packet will nevertheless be propagated when only the payload has been corrupted since a robust multimedia decoder might be able to use this packet correctly.

At each new radio hop, the CRC of the radio layer is recalculated, since it is a new radio link which is being established. This also allows faster processing of the transmissions hop by hop (the detection of new errors giving rise to more processing) and prevents nodes not equipped with the method according to an embodiment of the invention from discarding the partially corrupted packet. It is important to note that the recalculation of this CRC means that, so as not to lose the knowledge of a corruption, it is preferable to mark the packet of information with a label (denoted CRC_Error_flag) indicating whether the payload is or is not erroneous. This is due to the fact that the use of the transport checksum is not sufficient to detect that which only the radio header of the hop where the corruption has occurred will be able to detect.

In the embodiment considered here, it is proposed that this label be integrated as an item of information in a specific stretch of the RTP header of the packet. In an optional manner, the specific RTP header can contain an additional checksum (termed CRC RTPproxylite) allowing the validation of the RTP header and optionally of the first bytes of the payload. This additional functionality will make it possible to protect the key information which is not protected by the checksum of the transport layer, and therefore to ensure that the packet preserved with a CRC_Error_flag label equal to 1 has a reasonable chance of being useful for the multimedia decoder.

The CRC_Error_flag information item has notably three aims:
Make it possible to update the storage stack (P) with a version, detected to be correct, of a packet which would previously have been received with errors,
Decide (according to parameters in the client's request, or system choice) whether to propagate all the stored packets or only the correct packets,
Allow the client to provide its multimedia decoder with the corruption information so as to launch a robust decoding, if required.

As stated previously, the local stack (P) stores in the application layer (user space) not only the fragments received but also their identifiers and the CRC_error_flag information item. In order for the proxy function to be effective, the packet identifier must be unique and relevant. As it is desired that the node responds to a request of another user with this proxy function, the identifier must therefore contain at one and the same time the information item naming the multimedia stream but also an identification of the packet in this stream. Numerous solutions may be envisaged for this identifier, which will likewise be stored in the specific RTP header of the packet. On account of the variable approach adopted for the broadcasting, more than the video file itself, the fragments, namely the data packets segmented in a coherent manner at one and the same time for the application and for the network encapsulation, are here considered to be the unit to be identified. It is thus possible to envisage the format presented in Table 1

TABLE 1

Proposal for an identifier of a fragment transmitted on the ad hoc network.

| File identifier | Identification of the fragment | Information of the fragment in the file (optional) | Checksum | Validity of the fragment |
| --- | --- | --- | --- | --- |
| → for example obtained by hash function on the name of the file (eg: MD5 on 64 or 128 bits) | → number of fragment in the file. | → field making it possible to indicate optional operations done on the fragment (i.e. protection application, type of CRC used, etc.). | → Checksum on the fragment + range information. The checksum pertains to the RTF header + optionally a part of the payload. The object of this sum is to make it possible to detect the validity of the packet conveying the multimedia fragment (eg: 16/32 | → CRC_error_flag label indicating whether the fragment is corrupted or valid (no error). |

TABLE 1-continued

Proposal for an identifier of a fragment transmitted on the ad hoc network.

| File identifier | Identification of the fragment | Information of the fragment in the file (optional) | Checksum | Validity of the fragment |
|---|---|---|---|---|
| | | | bits of a CRC, 64 bits with MD5 etc.) | |

By virtue of the operation of the proxylite, requests made by clients in the ad hoc network (operations on the "upgoing" pathway) will be intercepted by each of the nodes and the request will be compared with the list of packets in memory in the stack (P) of the current node. In the case where one (or more) of the requested packets is (are) present in the stack, the client's request is modified so that it now pertains only to the missing fragments and the available fragments are extracted from the stack (P) for transmission to the requesting client.

However, it remains important to bear in mind the fact that the packets marked with a CRC_error_flag equal to 1 could be too corrupted to be usable by one, several or all the clients. So that it is possible for the relevance of the corrupted packet to be called into question, we therefore also propose that the addressees to which the corrupted frames have been transmitted be stored in the list of additional information appended to its fragment in the stack (P). Thus, in the case where a second request is received from a client for a corrupted fragment which has already been transmitted to him, it will be deduced therefrom that the fragment has a high chance of being too corrupted to be useful, and it will therefore be deleted from the stack (P) before retransmitting the request relating to this fragment to the source.

Figure 6:
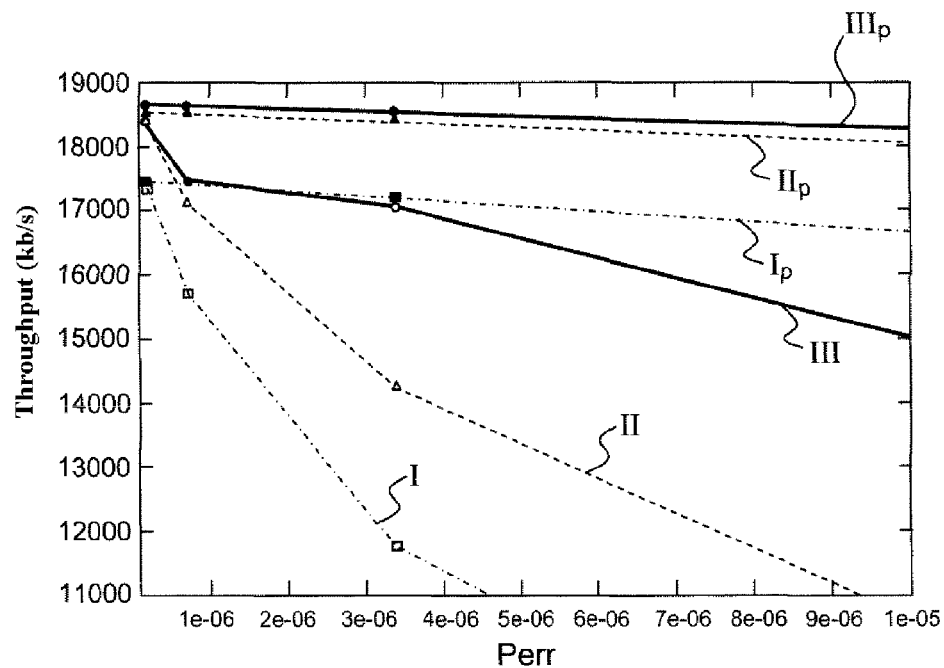
Figure 7:
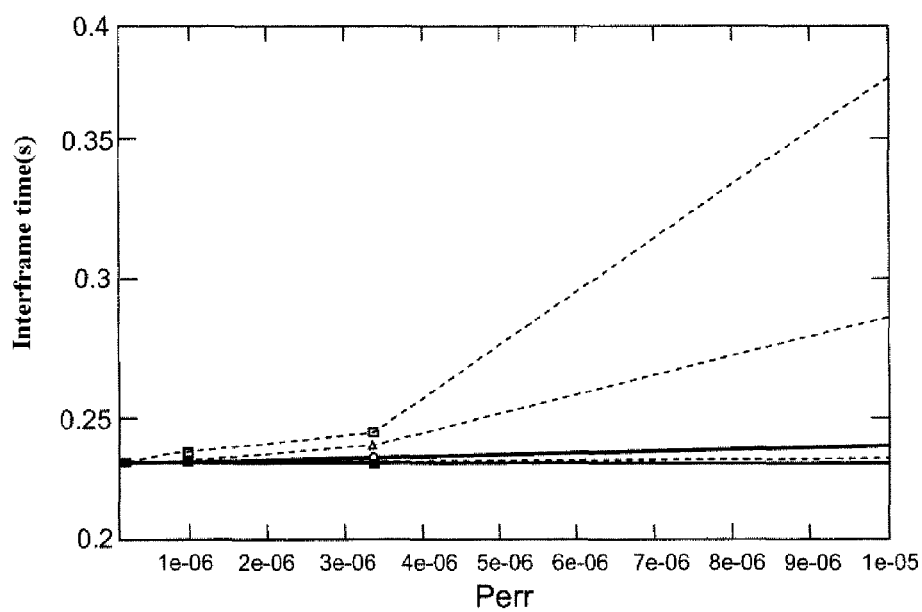

FIGS. 6 and 7 describe the measurements of the variation in useful bit rate offered for various configurations of the system; curves I, II, III correspond to the results obtained by the prior art systems, for 2, 4 and 6 hops respectively. Curves Ip, IIp, IIIp are obtained for 2, 4 and 6 respectively, using the method according to an embodiment of the invention. From these curves it emerges that the proxylite functionality results in a saving, which limits the drop in bit rate with the increase in the duration of the mean time interval between the reception of two video frames for the client.

Figure 8:
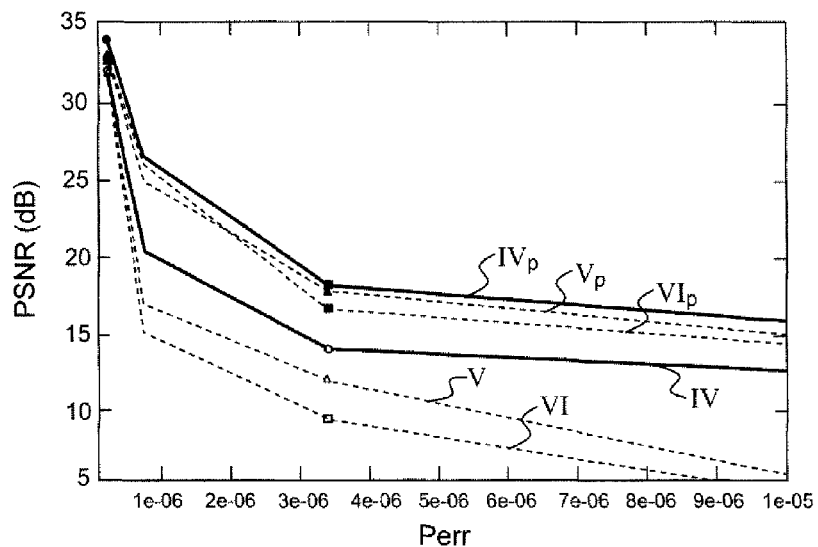
Figure 9:
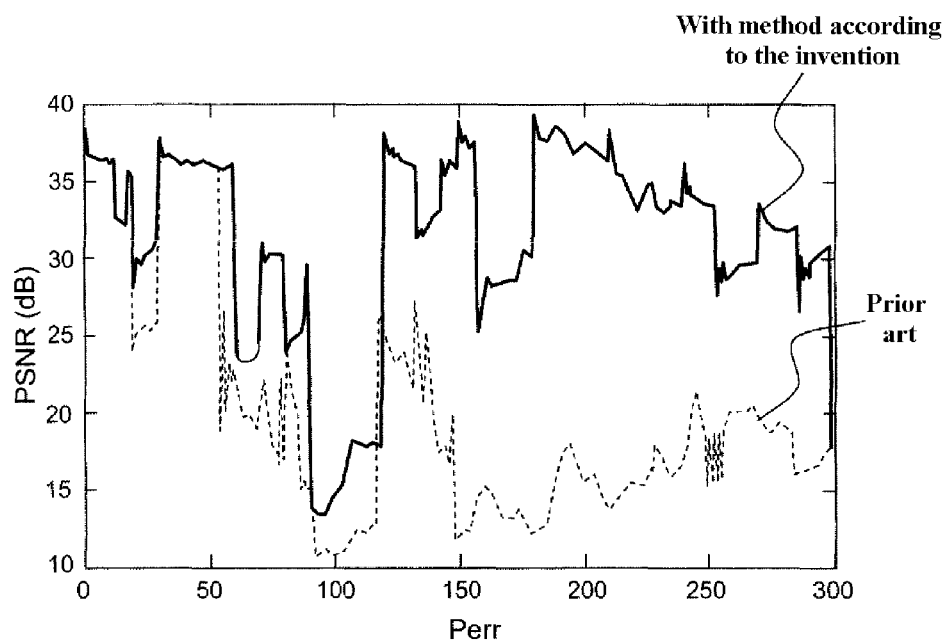

FIG. 8 shows for the same configurations of the system as in FIGS. 6 and 7 the gain in terms of objective quality (represented by the PSNR Peak Signal to Noise Ratio); curves IV, V, VI correspond to the results obtained by the prior art systems, for 2, 4 and 6 hops respectively, the index p corresponding to the curves obtained using the method according to an embodiment of the invention. This is still more clearly apparent when observing the variation in the instantaneous video quality of the video transmitted.

In a context where the radio resource is rare or expensive and/or for the sake of economy, node batteries play the role of an ad hoc network (in a network of mobile peers, each node plays the role of relay, including for data which does not relate it to, and therefore for which it will not want to exhaust its battery, it will therefore be beneficial to request a retransmission of erroneous multimedia data only if the error rate is really significant, that is to say that the information transmitted by the corrupted packet is not sufficient for the multimedia decoder to provide a relevant masking. Statistically, obtaining correct headers, for example by means of the UDP-Lite checksum, in a packet is a reasonable test of whether there is a chance that the packet will not be too corrupted for the sources decoder to know how to use it.

The method and the system according to embodiments of the invention improve the performance of point-to-multipoint transmissions by virtue of the "proxy" and "lite" double function. One of the benefits of this system is that it can adapt to any adaptive routing technique so as to harness same and improve the performance of the system.

Embodiments of the invention also make it possible to limit the passband used to the useful transmissions (a node which knows an item of information provides it directly, making it unnecessary to go back to the source (proxy function). This operation is even done for packets that may possibly be corrupted at the payload level, so as to harness the capabilities of multimedia streams to be displayed with a few errors or losses (proxylite function).

Moreover, each packet is marked so that it is possible to know its exact state (corrupted or not) and permit of refuse requests for retransmission as a function of the users/system choices.

The invention claimed is:

1. A method for transmitting multimedia data in an ad hoc communication network comprising at least one source S and a plurality of nodes Ni communicating with one another through links Li, a number Np of the plurality of nodes being equipped with a processor adapted for executing at least the following steps:

receiving at least one multimedia data packet, said data packet including at least one header, a transport header CRC, a CRC header, and a radio CRC, performing a calculation of a complete radio CRC, including the at least one header, the transport header CRC, the CRC header, and the radio CRC of the said packet received, a) eliminating the packet if the value of the CRC header includes an error;

b) if a value of the CRC header is error-free, determining if the node Ni of the processor executing this step is addressed by the data packet, and marking said data packet with a flag (CRC Error_Flag) when the payload of the packet data is erroneous, c) If the node of the processor executing this step is the addressed by the data packet, then uploading the value of the complete radio CRC, testing whether a value of the transport header CRC is erroneous, eliminating the data packet if this value is erroneous, otherwise, uploading the packet to an application for decoding, d) If the node of the processor executing this step is not addressed by the data packet, then, storing the packet in a temporary stack Q and initializing a timer T pkId corresponding to a maximum duration of processing of the data of the packet, verifying the value of the complete radio CRC of said packet, if said value is correct then modifying the stack Q and resetting the timer Tpkld to zero so as to dispatch the packet, and starting the processing of another multimedia data packet, if the value of the radio CRC of the data is erroneous, then, launching a triggering of a timer CKS_VER(Pkld) or a verification at a data load integrity level, in parallel, uploading of the packet of the multimedia data to a top layer of the communication network, while eliminating packets for which a respective value of the CRC transport is erroneous and while uploading headers for the Pkld for the packets for which the value of the CRC for a specific real-time transfer protocol (RTP) is correct, if the timer CKS_VER(Pkld) which corresponds to the verification of the integrity of the packet has expired, modifying the stack Q by eliminating the packet, e) upon the expiry of the timer T(Pkld) extracting the packet from the stack Q so as to transmit it to at least one of a new hop and to another node of the network, for this purpose it will perform a re-calculation of the complete radio CRC, and then will send the packet on a physical link to a next hop destined for a node of the network.

2. The method as recited in claim 1 wherein in step d), if the timer CKS_VER(Pkld) has not expired, then modifying at least one of a temporary memory and the stack Q by setting a field indicating the corruption of the packet.

3. The method as recited in claim 1 wherein a data packet includes a label corresponding to an item of information in a specific stretch of a RTP header of the packet, the specific RTP header containing an additional checksum allowing the validation of the RTP header and optionally of at least one of a first bytes of the payload, packets being eliminated when this value is erroneous.

4. The method as recited in claim 1 further comprising a step of storing information including at least the following steps:

when the node on which the data are received is addressed simultaneously uploading the value of the complete radio CRC, and making, a copy of the packet in a stack P for storage in the said stack P of at least one of an identifier of the packet, the payload, its data of the packet and the state of the packet, in the case where the node is not addressed, then, when the value of the complete radio CRC is incorrect, uploading, the erroneous information item, for storage, and triggering the timer CKS_VER(Pkld) for verification of the packet, when the value of the complete radio CRC is correct and the value of the CRC_Error Flag is correct, transmitting the correct information item for storage, uploading the erroneous information item for storage and according to the steps of claim 1, triggering a request for verification of the integrity of the packet CKS_VER_REQ, and timer launch CKS_VER(Pkld) for verification of the integrity of the packet, during the step of uploading the packet to the top layers, uploading the storage information for the packet Pkld to the stack P, in the case where the transmission on the last hop has corrupted the packet, a response module for answering the check requests CKS_VER_REQ is invoked and will therefore, upon a launch of the timer CKS-VER(Pkld), in parallel with the uploading, interrogate, the stack P to verify whether the latter contains an intact version of the packet, in which case the timer CKS—VER(Pkld) is set to zero, and substituting for the erroneous payload the intact payload in the stack Q, upon the expiry of the timer T(Pkld), extracting the packet for transmission while having beforehand, recalculated the radio CRC, if it does not find any intact packet, awaiting the packet uploading and it propagates the packet when only the payload or data has been corrupted.

5. The method as recited in claim 2 wherein during the storage in the stack P, storing the data received at the level of the node as well as the data identification, an information item regarding its possible corruption upon each uploading in the stack P.

6. The method as recited in claim 4 wherein a node realizes a proxy function and wherein it comprises the following steps: said node intercepts the upgoing requests, the requests sent from a client to the sending source, and in that it includes at least the following steps:

on receipt of a new multimedia transmission request, the method:

calculates the complete radio CRC value;

tests the value of the link header CRC, if the latter is erroneous, then the packet is eliminated if the value of the header CRC is error-free: then if the node is the addressee: the packet is uploaded to the application if the node is not the addressee, then:

the packet is stored in the temporary stack Q with the timer Tpkld the packet is uploaded to the application, upon the expiry of the timer the packet is transmitted on a new hop after re-calculation of the complete CRC At the application level:

if the requested data are stored in the stack P, the stack dispatches the necessary response or commences directly the transmission of the requested data, otherwise it dispatches a message to eliminate the packet from the stack Q.

7. A system for transmitting multimedia data in an ad hoc network comprising at least one source sending multimedia data and several nodes Ni communicating with one another by virtue of links Li, the said nodes comprising a receiver part (4), making it possible to receive a data packet, and a sending part (5) the function of which is to transfer a packet to an Ni, characterized in that Np nodes are equipped with the following additional elements: a stack Q corresponding to a temporary storage memory, a stack P or long-term memory, and a processor (6) adapted to:

receive at least one multimedia data packet, said data packet including at least one header, a transport header CRC, a CRC header, and a radio CRC, perform a calculation of a complete radio CRC, including the at least one header, the transport header CRC, the CRC header, and the radio CRC of the said packet received, a) eliminate the packet if the value of the CRC header includes an error;

b) if a value of the CRC header is error-free, then determining if the node Ni of the processor executing this step is addressed by the data packet, and marking said data packet with a flag (CRC Error_Flag) when the payload of the packet data is erroneous, c) If the node of the processor executing this step is the addressed by the data packet, then uploading the value of the complete radio CRC, testing whether a value of the transport header CRC is erroneous, eliminating the data packet if this value is erroneous, otherwise, uploading the packet to an application for decoding, d) If the node of the processor executing this step is not addressed by the data packet, then, storing the packet in a temporary stack Q and initializing a timer T pkld corresponding to a maximum duration of processing of the data of the packet, verifying the value of the complete radio CRC of said packet, if said value is correct then modifying the stack Q and resetting the timer Tpkld to zero so as to dispatch the packet, and starting the processing of another multimedia data packet, if the value of the radio CRC of the data is erroneous, then, launching a triggering of a timer CKS_VER(Pkld) or a verification at a data load integrity level, in parallel, uploading of the packet of the multimedia data to a top layer of the communication network, while eliminating packets for which a respective value of the CRC transport is erroneous and while uploading headers for the Pkld for the packets for which the value of the CRC for a specific real-time transfer protocol (RTP) is correct, if the timer CKS_VER(Pkld) which corresponds to the verification of the integrity of the packet has expired, modifying the stack Q by eliminating the packet, e) upon the expiry of the timer T(Pkld) extracting the packet from the stack Q so as to transmit it to at least one of a new hop and to another node of the network, for this purpose it will perform a re-calculation of the complete radio CRC, and then will send the packet on a physical link to a next hop destined for a node of the network.

8. The system as recited in claim 7, wherein a node is equipped with a stack P or long-term memory which will serve for storing information on packets that have passed through this node, whether the node is the addressee or simply a transit node capable of preserving the data for a use a future request after CRC recalculations, if any.

* * * * *